United States Patent
Asanuma

(10) Patent No.: US 9,194,940 B2
(45) Date of Patent: Nov. 24, 2015

(54) SIGNAL PROCESSING APPARATUS, RADAR APPARATUS, AND SIGNAL PROCESSING METHOD

(75) Inventor: Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 667 days.

(21) Appl. No.: 13/552,229

(22) Filed: Jul. 18, 2012

(65) Prior Publication Data

US 2013/0030769 A1 Jan. 31, 2013

(30) Foreign Application Priority Data

Jul. 30, 2011 (JP) .................................. 2011-167859

(51) Int. Cl.
| | |
|---|---|
| G06F 15/00 | (2006.01) |
| G01S 7/35 | (2006.01) |
| G01S 3/74 | (2006.01) |
| G01S 13/34 | (2006.01) |
| G01S 13/42 | (2006.01) |
| G01S 13/48 | (2006.01) |
| G01S 13/58 | (2006.01) |
| G01S 13/93 | (2006.01) |

(52) U.S. Cl.
CPC . *G01S 7/354* (2013.01); *G01S 3/74* (2013.01); *G01S 13/343* (2013.01); *G01S 13/42* (2013.01); *G01S 13/48* (2013.01); *G01S 13/584* (2013.01); *G01S 13/931* (2013.01); *G01S 2007/356* (2013.01)

(58) Field of Classification Search
CPC ......... G01S 3/74; G01S 13/42; G01S 13/584; G01S 7/354; G01S 13/48; G01S 13/343; G01S 2007/356; G01S 13/931
See application file for complete search history.

(56) References Cited

U.S. PATENT DOCUMENTS

| | | | | |
|---|---|---|---|---|
| 7,884,756 | B2 * | 2/2011 | Kai ............................... | 342/149 |
| 8,436,763 | B2 * | 5/2013 | Wintermantel ................ | 342/70 |
| 8,446,312 | B2 * | 5/2013 | Kanamoto et al. ........... | 342/149 |
| 8,665,137 | B2 * | 3/2014 | Wintermantel ................ | 342/59 |
| 2004/0252047 | A1 * | 12/2004 | Miyake et al. ................ | 342/107 |
| 2007/0153255 | A1 * | 7/2007 | Ishii et al. ...................... | 356/28 |

(Continued)

FOREIGN PATENT DOCUMENTS

| | | |
|---|---|---|
| JP | A-2010-25928 | 2/2010 |
| JP | 2010-071958 A | 4/2010 |

OTHER PUBLICATIONS

Mar. 24, 2015 Office Action issued in Japanese Patent Application No. 2011-167859.

(Continued)

*Primary Examiner* — Carol S Tsai
(74) *Attorney, Agent, or Firm* — Oliff PLC

(57) ABSTRACT

Provided is a signal processing apparatus configured to calculate an angle of a detection point corresponding to an object on the basis of received signals of a plurality of array antennas. A beat signal is generated by a difference between a transmitted signal and a received signal. Digital data is derived through AD conversion of the beat signal. The digital data is divided into a plurality of data groups. A fast Fourier transform is performed on the data groups to acquire a plurality of transformed data corresponding to the number of the data groups. The transformed data are divided into a plurality of sets, correlation matrices for the respective sets are acquired, and an average value of the correlation matrices is calculated. The angle of the detection point is calculated on the basis of the average value of the correlation matrices.

5 Claims, 8 Drawing Sheets

(56) References Cited

U.S. PATENT DOCUMENTS

| | | | |
|---|---|---|---|
| 2010/0085240 A1* | 4/2010 | Kai | 342/108 |
| 2011/0074620 A1* | 3/2011 | Wintermantel | 342/70 |
| 2011/0074621 A1* | 3/2011 | Wintermantel | 342/70 |
| 2011/0080314 A1* | 4/2011 | Wintermantel | 342/147 |
| 2011/0148578 A1* | 6/2011 | Aloi et al. | 340/8.1 |

OTHER PUBLICATIONS

Sep. 16, 2015 Office Action issued in Japanese Patent Application No. 2011-167859.

* cited by examiner

SIGNAL PROCESSING APPARATUS, RADAR APPARATUS, AND SIGNAL PROCESSING METHOD

The disclosure of Japanese Patent Application No. 2011-167859 filed on Jul. 30, 2011, including specification, drawings and claims is incorporated herein by reference in its entirety.

TECHNICAL FIELD

The present invention relates to signal processing in object detection.

BACKGROUND

There is a radar apparatus which receives reflected waves obtained through reflection of transmitted waves from an object. The radar apparatus, which has received the reflected waves, generates a beat signal that represents a difference between a transmitted signal corresponding to the transmitted waves and a received signal corresponding to the received waves. A signal processing apparatus of the radar apparatus performs fast Fourier transform of the beat signal to derive transformed data. Further, the signal processing apparatus derives a signal having a level that exceeds a predetermined threshold value (hereinafter referred to as a "peak signal") in the transformed data in a first period where the frequency of the transmitted signal ascends and in a second period where the frequency descends, and calculates a position of a detection point pertaining to the object through calculation of the derived peak signal.

On the other hand, in the case where the radar apparatus is provided with a plurality of array antennas, one of algorithms of DBF (Digital Beam Forming), PRISM (Propagator method based on an Improved Spatial-smoothing Matrix), MUSIC (Multiple Signal Classification), and ESPRIT (Estimation of Signal Parameters via Rotational Invariance Techniques) is used to calculate an angle of the detection point. For example, in the case of using the ESPRIT among the above-described algorithms, spatial smoothing preprocessing may be used to derive a correlation matrix that is used to calculate the angle of a detection point.

The spatial smoothing preprocessing is a process of deriving ideal signal components that correspond to desire waves by reducing mutual interference components of received signals through generation of a plurality of correlation matrices by means of a sub-array that is a combination of a predetermined number of antennas among a plurality of array antennas and derivation of an average of the correlation matrices through addition of the correlation matrices. That is, by adding the correlation matrices based on transformed data acquired through performing of the fast Fourier transform of the signals received from the reception antennas, an average value of the correlation matrices is derived, and thus signals having a reduced influence of the mutual interference components are derived.

Further, in the case where the first period where the frequency of the transmitted signal ascends and the second period where the frequency descends constitute one period of the transmitted signal, the number of correlation matrices that are generated in proportion to the increase in the number of continuous periods of the transmitted signal is increased, and the number of correlation matrices that are used in the spatial smoothing preprocessing is also increased. Further, as the number of correlation matrices used in the spatial smoothing processing becomes larger, the reduction rate of the mutual interference components of the received signal is also increased. Accordingly, it is preferable to generate the correlation matrices through increasing of the number of continuous periods as large as possible. That is, by increasing the continuous output time of the transmitted waves that correspond to the transmitted signal, the correlation matrices are generated in each period of the transmitted signal, and the average value of the correlation matrices is derived through addition of all the correlation matrices. Accordingly, the mutual interference components of the received signal is greatly reduced, and thus it becomes possible to derive respective angles of a plurality of detection points pertaining to the object can be exactly derived with high accuracy. On the other hand, as a material that describes the technology according to the present invention, there is Patent Document 1.

Patent Document 1: Japanese Patent Application Publication No. 2010-025928

However, if the time for which a radar apparatus of 1 continuously transmits the transmitted waves is increased, the possibility that another radar apparatus receives at least one of the transmitted waves and the reflected waves from the radar apparatus of 1 would become higher. In this case, another radar apparatus may detect incorrect detection points.

Further, as the time for which the radar apparatus continuously transmits the transmitted waves is increased, the amount of heat generated inside the radar apparatus is increased. Due to this, the load on components constituting the radar apparatus is increased. Accordingly, it is required to shorten the time when the transmitted waves are continuously output as short as possible, that is, to reduce the number of periods where the transmitted signal is continuous. However, if the time for which the transmitted waves are continuously output is shortened, the number of correlation matrices used in the spatial smoothing preprocessing is reduced, and thus the angles of the detection points may not be accurately derived.

SUMMARY

It is therefore an object of the present invention to improve the accuracy in detecting the angle of an object through shortening of the output time of transmitted waves.

In order to achieve the above object, according to a first aspect of the embodiments of the present invention, there is provided a signal processing apparatus configured to calculate an angle of a detection point corresponding to an object on the basis of received signals of a plurality of array antennas, the signal processing apparatus comprising: a generating unit configured to generate a beat signal by a difference between a transmitted signal having a frequency that is changed in a predetermined period and a received signal obtained by receiving reflected waves of transmitted waves on the basis of the transmitted signal at the detection point; a deriving unit configured to derive digital data through AD conversion of the beat signal; a dividing unit configured to divide the digital data into a plurality of data groups; an acquiring unit configured to perform a fast Fourier transform on the data groups to acquire a plurality of transformed data corresponding to the number of the data groups; a first calculating unit configured to divide the transformed data into a plurality of sets, acquires correlation matrices for the respective sets, and calculate an average value of the correlation matrices; and a second calculating unit configured to calculate the angle of the detection point on the basis of the average value of the correlation matrices.

The dividing unit may divide the digital data into the data groups for a predetermined number of data.

The dividing unit may divide the digital data in a first period wherein the frequency of the transmitted signal ascends and in a second period where the frequency of the transmitted signal descends.

According to a second aspect of the embodiments of the present invention, there is provided a radar apparatus comprising: the above-described signal processing apparatus; a transmitting unit configured to transmit the transmitted waves; a receiving unit configured to receive the reflected waves; and an outputting unit configured to output information on the detection point detected by the signal processing apparatus to a vehicle control device which controls respective parts of a vehicle.

According to a third aspect of the embodiments of the present invention, there is provided a signal processing method for calculating an angle of a detection point corresponding to an object on the basis of received signals of a plurality of array antennas, the signal processing method comprising: generating a beat signal by a difference between a transmitted signal having a frequency that is changed in a predetermined period and a received signal obtained by receiving reflected waves of transmitted waves on the basis of the transmitted signal at the detection point; deriving digital data through AD conversion of the beat signal; dividing the digital data into a plurality of data groups; performing a fast Fourier transform on the data groups to acquire a plurality of transformed data corresponding to the number of the data groups; dividing the transformed data into a plurality of sets, acquiring correlation matrices for the respective sets, and calculating an average value of the correlation matrices; and calculating the angle of the detection point on the basis of the average value of the correlation matrices.

According to the present invention, by increasing the number of transformed data through division of the digital data into the data groups, the number of transformed data is prevented from being reduced even in the case where the transmission time of the transmitted waves is reduced, and thus it is possible to detect the angles of the objects corresponding to the detection points with high accuracy.

Further, according to the present invention, since the dividing means divides the digital data into the data groups for the predetermined number of data, the data groups having the same number of digital data can be obtained, and thus it is possible to detect the angles of the objects corresponding to the detection points with high accuracy.

Further, according to the present invention, since the dividing means performs the division in the first period where the frequency of the transmitted signal ascends and in the second period where the frequency of the transmitted signal descends, the number of data groups in the first period and in the second period can be increased, and thus it is possible to detect the angles of the objects corresponding to the detection points with high accuracy.

Further, according to the present invention, by outputting the information of the detection points detected by the signal processing apparatus to the vehicle control apparatus that controls the respective parts of the vehicle, the vehicle control that corresponds to the positions of the objects corresponding to the detection points can be performed.

BRIEF DESCRIPTION OF THE DRAWINGS

In the accompanying drawings.

DETAILED DESCRIPTION OF THE EMBODIMENTS

Hereinafter, preferred embodiments of the present invention will be described with reference to the accompanying drawings. The embodiments described hereinafter are exemplary, and the technical scope of the present invention is not limited thereto.

Figure 1:
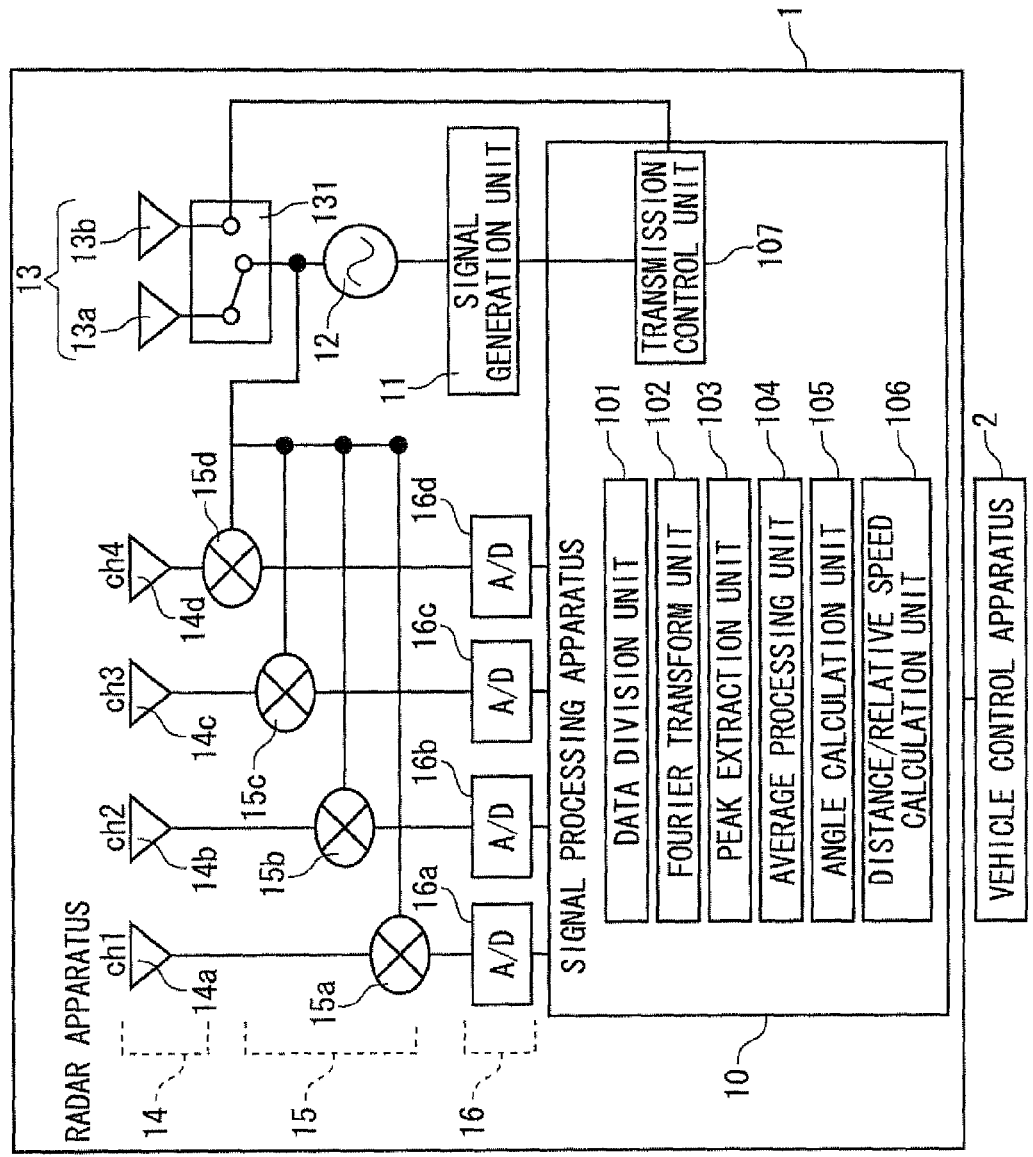
FIG. 1 is a block diagram of a radar apparatus.

<First Embodiment>
<1. Block Diagram>
FIG. 1 is a block diagram of a radar apparatus 1. The radar apparatus 1 detects detection points pertaining to an object such as another vehicle around a vehicle. The result of the detection of the detection points is transmitted to a vehicle control apparatus 2 that outputs control signals to respective parts of the vehicle to be used to control the vehicle, such as adjustment of an accelerator position and tightening of a seat belt mounted by a vehicle user.

The radar apparatus 1 mainly includes a signal processing apparatus 10, a signal generation unit 11, an oscillator 12, a transmission antenna 13, a reception antenna 14, a mixer 15, and an AD (Analog to Digital) converter 16.

The signal processing apparatus 10 detects a position of a detection point pertaining to an object on the basis of a received signal received by the radar apparatus 1. The detailed processing of the signal processing apparatus 10 will be described later.

The signal generation unit 11 generates a modulation signal of which the voltage is changed in the shape of a triangular wave on the basis of an instruction signal of a transmission control unit 107 to be described later.

The oscillator 12 performs frequency modulation of a signal having a predetermined frequency band (for example, 76.5 GHz) on the basis of the modulation signal generated by the signal generation unit 11, and outputs the frequency-modulated signal to the transmission antenna 13.

The transmission antenna 13 outputs the transmitted waves corresponding to the transmitted signal to the outside of the vehicle. The radar apparatus 1 according to this embodiment has two transmission antennas 13a and 13b as the transmission antenna. The transmission antennas 13a and 13b are switched in a predetermined period by the switching of a switching unit 131, and the transmitted waves from the transmission antenna 13 that is connected to the oscillator 12 is continuously output to the outside of the vehicle.

The switching unit 131 is a switch that switches the connection between the oscillator 12 and the transmitted antenna 13, and connects any one of the transmission antenna 13a and the transmission antenna 13b to the oscillator 12 according to the instruction signal of the transmission control unit 107.

The reception antenna 14 includes a plurality of array antennas that receive reflected waves obtained through reflection of the transmitted waves, which are continuously transmitted from the transmission antenna 13, from the object. In this embodiment, four reception antennas 14a (ch1), 14b (ch2), 14c (ch3), and 14d (ch4) are provided as the reception antenna. On the other hand, the reception antennas 14a to 14d are arranged at regular intervals.

The mixer 15 is provided in each reception antenna. The mixer 15 mixes the received signal with the transmitted signal, and a beat signal representing the difference between the transmitted signal and the received signal is generated through mixing of the received signal with the transmitted signal to be output to the AD converter 16.

The AD converter 16 derives sampling data through sampling of the beat signal that is an analog signal in the predetermined period. Further, the AD converter 16 quantizes the sampled data, converts the beat signal that is the analog data into digital data, and outputs the digital data to the signal processing apparatus 10. On the other hand, in the same manner as the mixer 15, the AD converter 16 is provided for each reception antenna.

The signal processing apparatus 10 mainly includes functions of a data division unit 101, a Fourier transform unit 102, a peak extraction unit 103, an average processing unit 104, an angle calculation unit 105, a distance/relative speed calculation unit 106, and a transmission control unit 107. Hereinafter, the respective functions will be described.

The data division unit 101 divides the digital data output from the AD converter 16 into a plurality of data groups. For example, if there are 2500 pieces of digital data acquired through the AD conversion of the beat signal, the data division unit 101 divides the digital data into two data groups each of which includes 1250 pieces of digital data. On the other hand, the data division by the data division unit 101 is performed for each reception data. Because of this, in the case where the 2500 pieces of digital data are divided into two data groups through the AD conversion of the beat signal of one reception antenna as described above, for example, 8 data groups are acquired through summing of the data groups of four reception antennas. On the other hand, the detailed processing of the data division unit 101 will be described later.

The Fourier transform unit 102 performs fast Fourier transform with respect to the respective divided data groups. Through this, a plurality of transformed data indicating signal levels with respect to the frequencies is acquired. That is, in the case of 8 data groups, 8 pieces of transformed data are acquired.

The peak extraction unit 103 extracts a signal of which the signal level exceeds a predetermined threshold value (hereinafter referred to as a "peak signal") among the respective transformed data signals.

The average processing unit 104 divides the transformed data into a plurality of sets, and acquires correlation matrices for the respective sets. Specifically, the average processing unit 104 divides peak signals corresponding to one transformed data among the transformed data into the sets, and acquires the correlation matrices for the respective sets. Here, the corresponding peak signals are peak signals having substantially the same frequency and signal level of the transformed data. That is, by receiving the reflected waves from the same detection point through the reception antennas 14, a peak signal having substantially the same frequency and signal level and a different phase depending on the antenna spacing is present for each transformed data, and the peak signal becomes the corresponding peak signal.

After the correlation matrices are acquired for the respective sets, the correlation matrices of the respective sets are added together to derive an average value. On the other hand, the average value derived through addition of the correlation matrices of the respective sets is obtained by the following equation. In the equation, $R^n_{xx}$ denotes a correlation matrix of the n-th set of the transformed data, and $z_n$ denotes a weighting value for each correlation matrix.

[Expression 1]

$$\overline{Rxx} = \sum_{n=1}^{n} z_n R^n_{xx}$$

The angle calculation unit 105 calculates an angle of a detection point pertaining to the object on the basis of the average value of the correlation matrices derived by the average processing unit 104. The angle calculation is performed using an algorithm, for example, such as ESPRIT, and the angle of the detection point is calculated on the basis of an eigenvalue and eigenvector of the average value of the correlation matrices derived by the average processing unit 104. Through this, the angle of the object corresponding to the detection point can be detected with high accuracy.

The distance/relative speed calculation unit 106 calculates information on the distance between the detection point and the vehicle on which the radar apparatus 1 is mounted and the relative speed between the detection point and the vehicle on which the radar apparatus 1 is mounted on the basis of the peak frequency of the transformed data. Here, the distance is obtained by the following equation (1), and the relative speed is obtained by the following equation (2). R denotes the distance, fup denotes the average frequency of the peak signals of the transformed data in a period where the frequency ascends, fdn denotes the average frequency of the peak signals of the transformed data in a period where the frequency descends, ΔF is a modulation width (for example, 200 MHz) of the transmitted waves, fm denotes the modulated frequency, $f_o$ denotes the center frequency (for example, 76.5 GHz), and c denotes the propagation speed of the transmitted waves.

[Expression 2]

$$R = \frac{(f_{up} + f_{dn}) \cdot c}{2(4\Delta F \times f_m)} \quad (1)$$

Further, the relative speed is derived by the following equation, and V denotes the relative speed.

[Expression 3]

$$V = \frac{(f_{up} - f_{dn}) \cdot c}{2(4\Delta F \times f_m)} \quad (2)$$

On the other hand, the detailed processing of the distance/relative speed calculation unit 106 will be described later.

The transmission control unit 107 outputs the instruction signal for generating the modulation signal to the signal generation unit 11. That is, the transmission control unit 107 controls the transmission timing of the transmitted signal TX shown in FIG. 2 to be described later. Further, the transmission control unit 107 controls the switching of the transmission antenna 13 through the switching unit 131. That is, the transmission control unit 107 determines from which of the transmission antennas 13a and 13b the transmitted signal output from the oscillator 12 is transmitted to the outside of the vehicle.

<2. FM-CW Signal Processing>

Then, as an example of signal processing for object detection, the signal processing in an FM-CW (Frequency Modulated Continuous Wave) method will be described. Although the FM-CW method is described as an example in this embodiment, the method for detecting the position of an object through combination of a plurality of periods, such as a period where the frequency ascends and a period where the frequency descends, is not limited to the FM-CW method.

Figure 2:
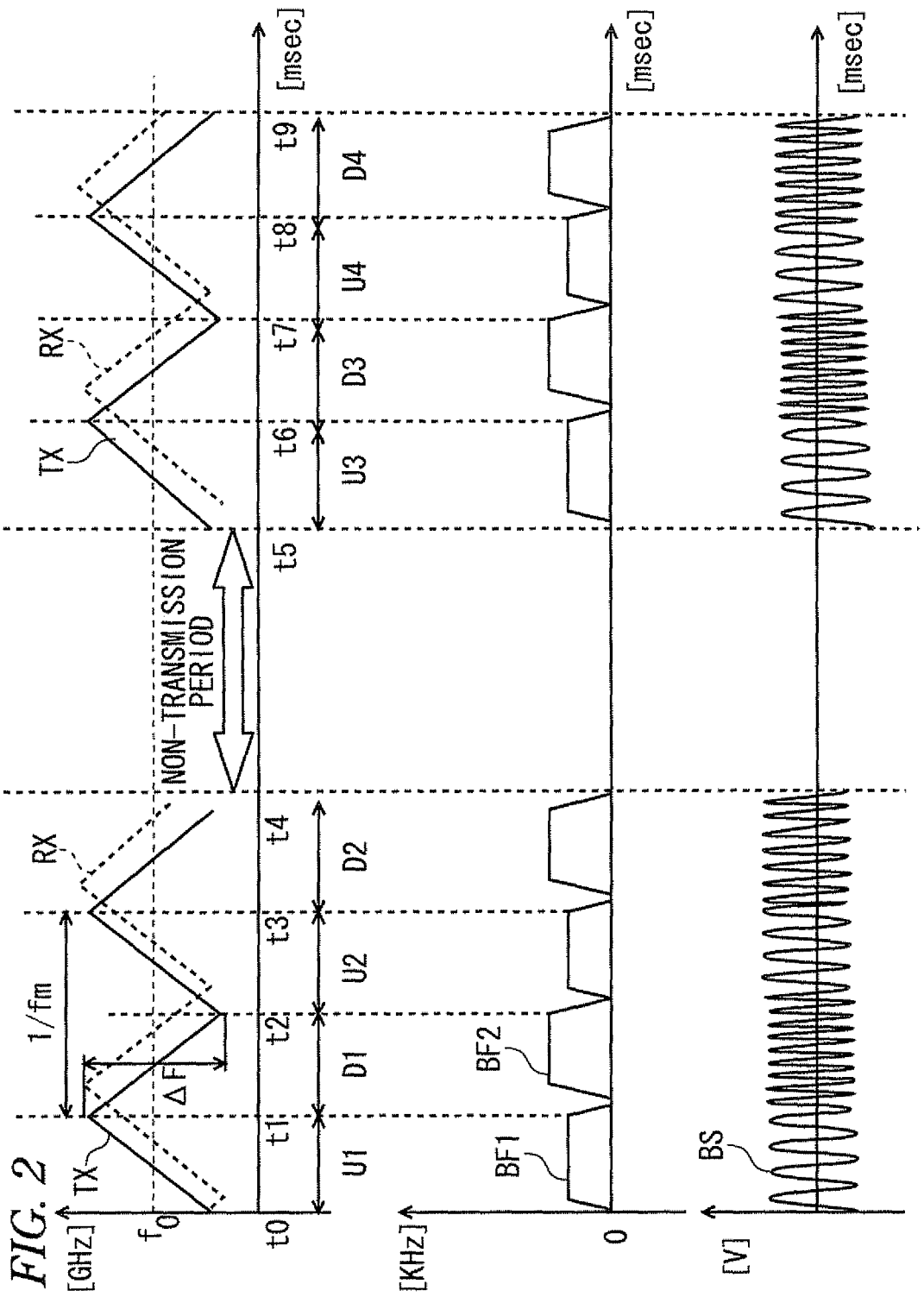
FIG. 2 is a diagram illustrating FM-CW type signals.

FIG. 2 is a diagram illustrating FM-CW type signals. Signal waveforms of the FM-CW type transmitted signal TX and received signal RX are illustrated as an upper figure of FIG. 2. Beat frequencies that are generated due to the difference between the transmitted signal TX and the received signal RX are illustrated as an intermediate figure of FIG. 2. Further, a beat signal that corresponds to the beat frequency is illustrated as a lower figure of FIG. 2.

In the upper figure of FIG. 2, the vertical axis represents frequency [GHz], and the horizontal axis represents time [msec]. The transmitted signal TX in the figure has a center frequency of $f_o$ (for example, 76.5 GHz), and repeats the constant change in the range of 200 MHz so that the transmitted signal TX ascends up to a predetermined frequency (for example, 76.6 GHz), and then descends to a predetermined frequency (for example, 76.4 GHz). As described above, there are a period where the frequency ascends up to the predetermined frequency (hereinafter referred to as an "UP" period, and for example, the UP period corresponds to periods U1, U2, U3, and U4 shown in FIG. 2) and a period where the frequency descends to the predetermined frequency (hereinafter referred to as a "DOWN" period, and for example, the DOWN period corresponds to periods D1, D2, D3, and D4).

In the radar apparatus 1 according to this embodiment, the transmitted waves output from the transmission antenna 13, which correspond to two periods of the transmitted signal TX in a state where a combination of the period U1 that is an UP period and the period D1 that is a DOWN period forms one period of the transmitted signal TX, are transmitted to the outside of the vehicle.

For the output of the transmitted waves corresponding to the transmitted signal TX, a non-transmission period to stop the output of the transmitted waves from the transmission antenna 13 for a predetermined time is provided. That is, by continuously outputting the transmitted waves corresponding to one period of the transmitted signal TX to the outside of the vehicle, the transmitted waves corresponding to two periods of the transmitted signal TX are output to the outside of the vehicle. After time that corresponds to the non-transmission period elapses, the transmitted waves that correspond to two periods of the transmitted signal TX are output to the outside of the vehicle. Through this, for example, in comparison to the case where the transmitted waves that correspond to four periods of the transmitted signal TX are transmitted, the time required to output the transmitted waves from the radar apparatus 1 to the outside of the vehicle can be reduced, and thus the influence on other radar apparatuses can be reduced.

However, in the case of calculating the angles of the detection points of the object using the algorithm such as ESPRIT, in comparison to the case where the transmitted waves that correspond to four periods of the transmitted signal TX, outputting the transmitted waves that correspond to two periods of the transmitted signals can reduce the reduction rate of the mutual interference components through derivation of the average of the correlation matrices using the spatial smoothing preprocessing.

Because of this, as described in <3. Detailed processing of a signal processing apparatus> below, the number of transformed data using the spatial smoothing preprocessing can be increased through division of the digital data transformed by the AD converter 16 into the data groups without changing the time required to output the transmitted waves (in a state where the periods of the transmitted signal TX are kept as two periods). Accordingly, in the case of outputting the transmitted waves corresponding to two periods of the transmitted signal TX, the reduction effect of the mutual interference components through derivation of the average of the correlation matrices using the spatial smoothing preprocessing becomes almost the same as that of the case where the transmitted waves corresponding to four periods of the transmitted signal TX are output.

On the other hand, the output of the transmitted waves to the outside of the vehicle is transmitted through switching of the transmission antenna 13. For example, after the transmitted waves that correspond to the initial one period of the two periods of the transmitted signal are transmitted from the transmission antenna 13a, the switching unit 130 switches the antenna connected to the oscillator 12 from the transmission antenna 13a to the transmission antenna 13b according to the instruction signal of the transmission control unit 107, and the transmitted waves corresponding to the remaining one period of the transmitted signal are transmitted from the transmission antenna 13b.

Further, if the reflected waves obtained through reflection of the transmitted waves transmitted from the transmission antenna 13 from the object are received in the reception antenna 14, the received signal RX through the reception antenna 14 is input to the mixer 15. Further, in the same manner as the transmitted signal TX, the received signal RX also includes a period where the frequency ascends up to a predetermined frequency and a period where the frequency descends to a predetermined frequency.

Further, depending on the distance between the vehicle on which the radar apparatus 1 is mounted and the detection point pertaining to the object, temporal delay occurs in the received signal in comparison to the transmitted signal. Further, if there is a difference in speed between the vehicle on which the radar apparatus 1 is mounted and the object, a difference as much as the Doppler shift occurs in the received signal against the transmitted signal.

In the intermediate figure of FIG. 2, the vertical axis represents frequency [GHz], and the horizontal axis represents time [msec]. In the figure, beat frequencies that indicate the difference between the transmitted signal and the received signal in the UP period and in the DOWN period are shown. For example, in the period U1, the beat frequency BF1 is derived, and in the period D1, the beat frequency BF2 is derived. As described above, the beat frequencies are derived in the respective periods.

In the lower figure of FIG. 2, the vertical axis represents amplitude [V], and the horizontal axis represents time [msec]. In the figure, a beat signal BS of an analog signal that corresponds to the beat frequencies is shown, and the beat signal BS is converted into digital data by the AD converter 16. On the other hand, in FIG. 2, the beat signal BS that is received from one detection point is shown. However, in the case where the transmitted waves corresponding to the transmitted signal TX are reflected from a plurality of detection points and a plurality of reflected waves are received in the reception antenna 14, the received signal RX is obtained through synthesis of the reflected waves, and the beat signal BS that indicates the difference between the transmitted signal TX is obtained through synthesis of the reflected waves.

<3. Detailed Processing of a Signal Processing Apparatus>

Figure 3:
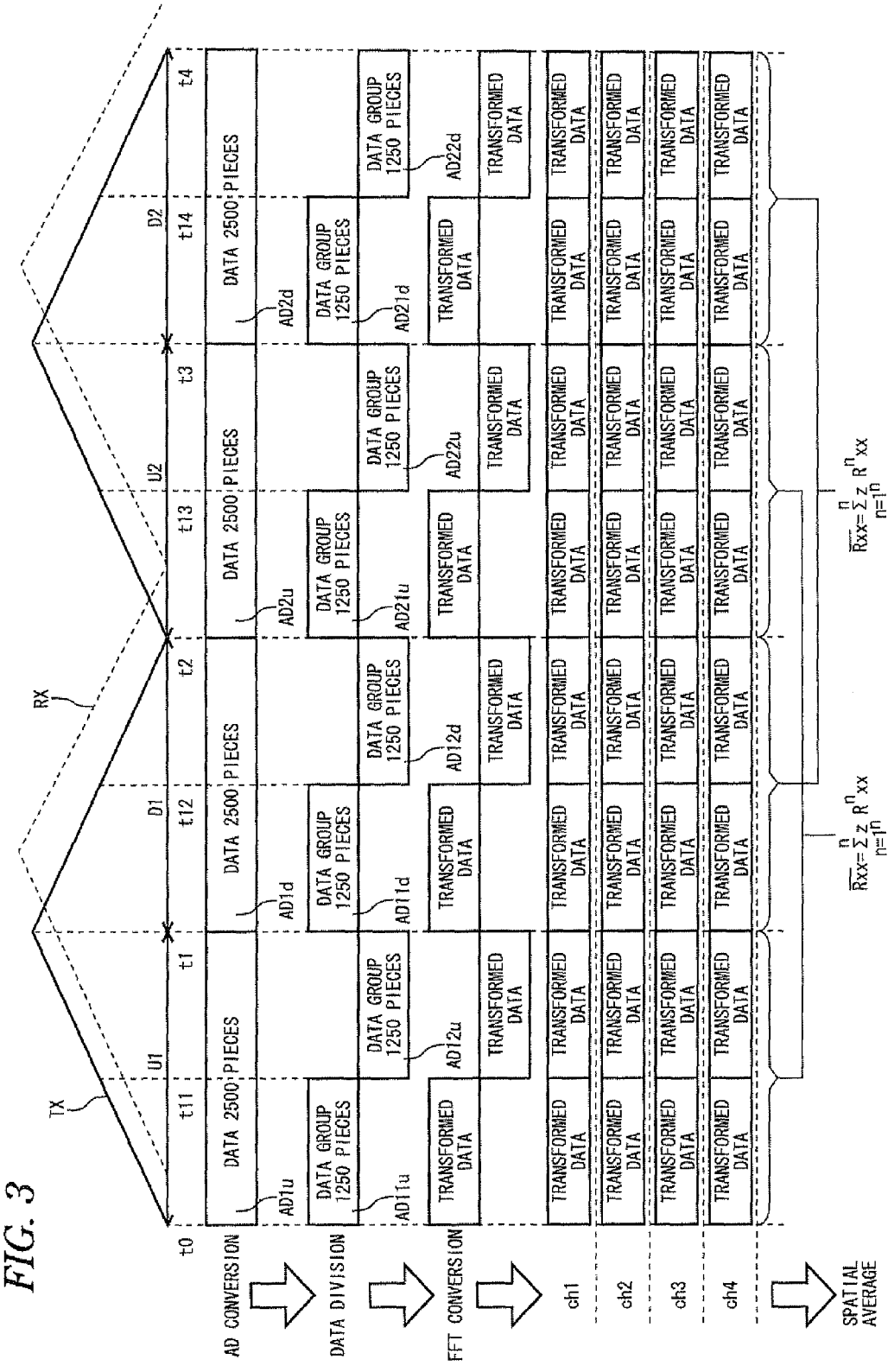
FIG. 3 is a diagram illustrating in detail the angle calculation in a signal processing apparatus.

FIG. 3 is a diagram illustrating in detail the angle calculation in a signal processing apparatus 10. In FIG. 3, a combination of an UP period and a DOWN period of the transmitted signal TX for two periods is shown, and the transmitted waves corresponding to the two periods of the transmitted signal TX are transmitted from the transmission antenna 13. Further, the received signal that is received as the reflected waves obtained through reflection of the transmitted waves from the object is shown. Further, the AD converter 16 converts the beat signal that is the difference between the transmitted signal TX and the received signal RX into digital data.

Specifically, referring to FIG. 3, there are 2500 pieces of digital data AD1$u$ that are obtained by converting the beat signal at a time (time t0 to t1) that corresponds to the UP period (period U1) of the first period of the transmitted signal TX through the AD converter 16. Also, there are 2500 pieces of digital data AD1$d$ at a time (time t1 to t2) that corresponds to the DOWN period (period D1) of the first period. Further, there are 2500 pieces of digital data AD2$u$ at a time (time t2 to t3) that corresponds to the UP period (period U2) of the second period, and there are 2500 pieces of digital data AD2$d$ at a time (time t3 to t4) that corresponds to the DOWN period (period D2) of the second period. The acquisition of such data is realized by determining a preset sampling period at a time corresponding to the UP period (DOWN period).

Then, the data division unit 101 divides the digital data, which have been AD-converted in the UP period and in the DOWN period, into a plurality of data groups. That is, the data division unit 101 divides the digital data (digital data Ad1$u$, Ad1$d$, AD2$u$, and AD2$d$), which have been AD-converted in four periods (periods U1, D1, U2, and D2), respectively, into a plurality of data groups. Specifically, the data division unit 101 divides 2500 pieces of digital data AD1$u$ in the period U1 that corresponds to the time t0 to t1 into data groups AD11$u$ that correspond to a time t0 to t11 that is a half of the time t0 to t1. That is, the data division unit 101 divides 2500 pieces of digital data into digital data each of which has a predetermined number of data (for example, in this embodiment, 1250 pieces of data that correspond to a half of 2500 pieces of data).

As the result of the division, a data group AD11$u$ having 1250 pieces of data corresponding to the time t0 to t11 and a data group AD12$u$ having 1250 pieces of data corresponding to time t11 to t1 are derived. Accordingly, the data groups each of which has the same number of digital data can be obtained, and thus the respective angles of the objects corresponding to the detection points can be detected with high accuracy.

In the same manner, the data division unit 101 divides 2500 pieces of digital data AD1$d$ in the period D1 corresponding to the time t1 to t2 into a data group AD11$d$ having 1250 pieces of data corresponding to the time t1 to t12 and a data group AD12$d$ having 1250 pieces of data corresponding to the time t12 to t2.

Further, the data division unit 101 divides 2500 pieces of digital data AD2$u$ in the period U2 corresponding to the time t2 to t3 into a data group AD21$u$ having 1250 pieces of data corresponding to the time t2 to t13 and a data group AD22$u$ having 1250 pieces of data corresponding to the time t13 to t3.

Further, the data division unit 101 divides 2500 pieces of digital data AD2$d$ in the period U2 corresponding to the time t3 to t4 into a data group AD21$d$ having 1250 pieces of data corresponding to the time t3 to t14 and a data group AD22$d$ having 1250 pieces of data corresponding to the time t14 to t4. As described above, by dividing the digital data into a plurality of data groups for a predetermined number of data, the data groups can be acquired without increasing the number of reception antennas. Further, the respective angles of the objects corresponding to the detection points can be derived with high accuracy.

Then, with respect to 8 data groups (data groups AD11$u$, AD12$u$, AD11$d$, AD12$d$, AD21$u$, AD22$u$, AD21$d$, and AD22$d$) that are obtained by dividing the digital data, the Fourier transform unit 102 performs fast Fourier transform to acquire 8 transformed data corresponding to the 8 data groups.

On the other hand, the number of data groups becomes the number that is in proportion to the number of reception antennas. That is, the 8 data groups previously described correspond to the number of data groups that are obtained by AD-converting the beat signal corresponding to the two periods of the transmitted signal of the reception antenna 14$a$ (ch1) using the AD converter 16$a$ and dividing the AD-converted digital data into the data groups.

The radar apparatus 1 according to this embodiment is provided with four reception antennas 14$a$ (ch1), 14$b$ (ch2), 14$c$ (ch3), and 14$d$ (ch4) as the reception antenna. That is, since 8 data groups can be acquired with respect to one reception antenna and four reception antennas are provided in the radar apparatus 1, the sum of the data groups that can be acquired becomes 32. As a result, the transformed data obtained by the Fourier transform unit 102 become 32 pieces of transformed data (transformed data of ch1 to ch4 illustrated in FIG. 3) that correspond to 32 data groups.

Figure 4:
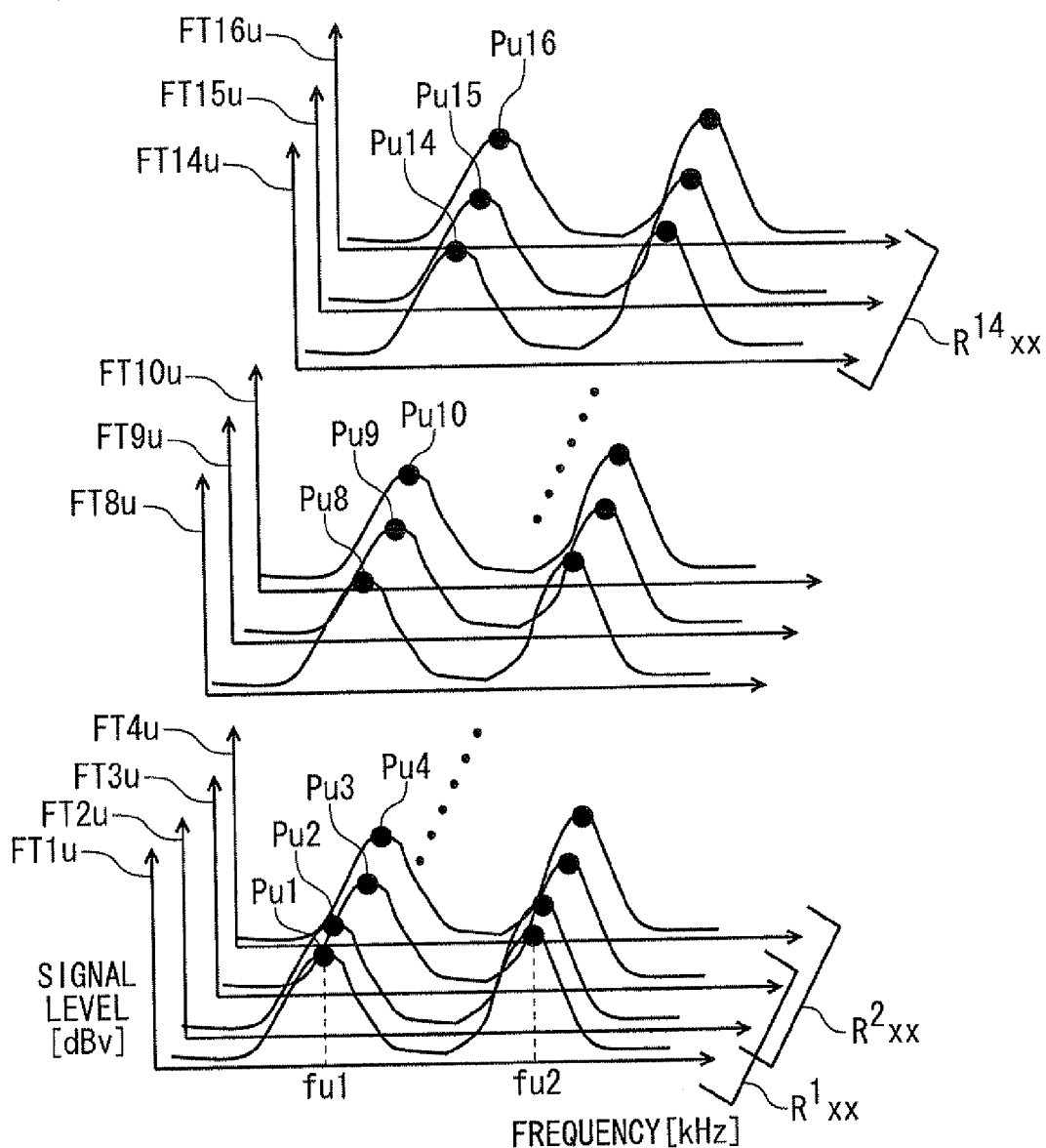
FIG. 4 is a diagram illustrating in detail the transformed data in an UP period.

Then, the peak extraction unit 103 extracts peak signals (for example, peak signals Pu1 to Pu16 of transformed data FT1$u$ to FT16$u$ shown in FIG. 4) having a frequency that is substantially the same as the frequency fu1 to which one peak signal (for example, a peak signal Pu1) belongs from the transformed data (16 pieces of transformed data) included in the UP period (periods U1 and U2) of 32 pieces of transformed data.

Here, since the reflected waves from a certain detection point are received in the reception antennas at about the same time, frequency information of the detection points included in the received signals RX of the respective reception antennas is approximately equal to each other (However, phase information differs from each other). That is, the peak signals on the frequency spectrum of which the fast Fourier transform has been performed appear at positions of substantially the same frequency with respect to the respective received signals RX. Accordingly, the peak extraction unit 103 extracts the peak signals Pu1 to Pu16 of the frequency fu1 as information based on the reflected waves from the same detection point. On the other hand, the peak extraction unit 103 also extracts the peak signals at a different frequency (frequency fu2) in the same manner.

Then, the average processing unit 104 calculates 14 sets of correlation matrices (for example, correlation matrices $R^1 xx$ to $R^{14} xx$ shown in FIG. 4), each set including peak signals of three pieces of neighboring transformed data when 16 pieces of transformed data are arranged, and an average value of the 14 sets of the calculated correlation matrices is derived using the spatial smoothing preprocessing.

Figure 5:
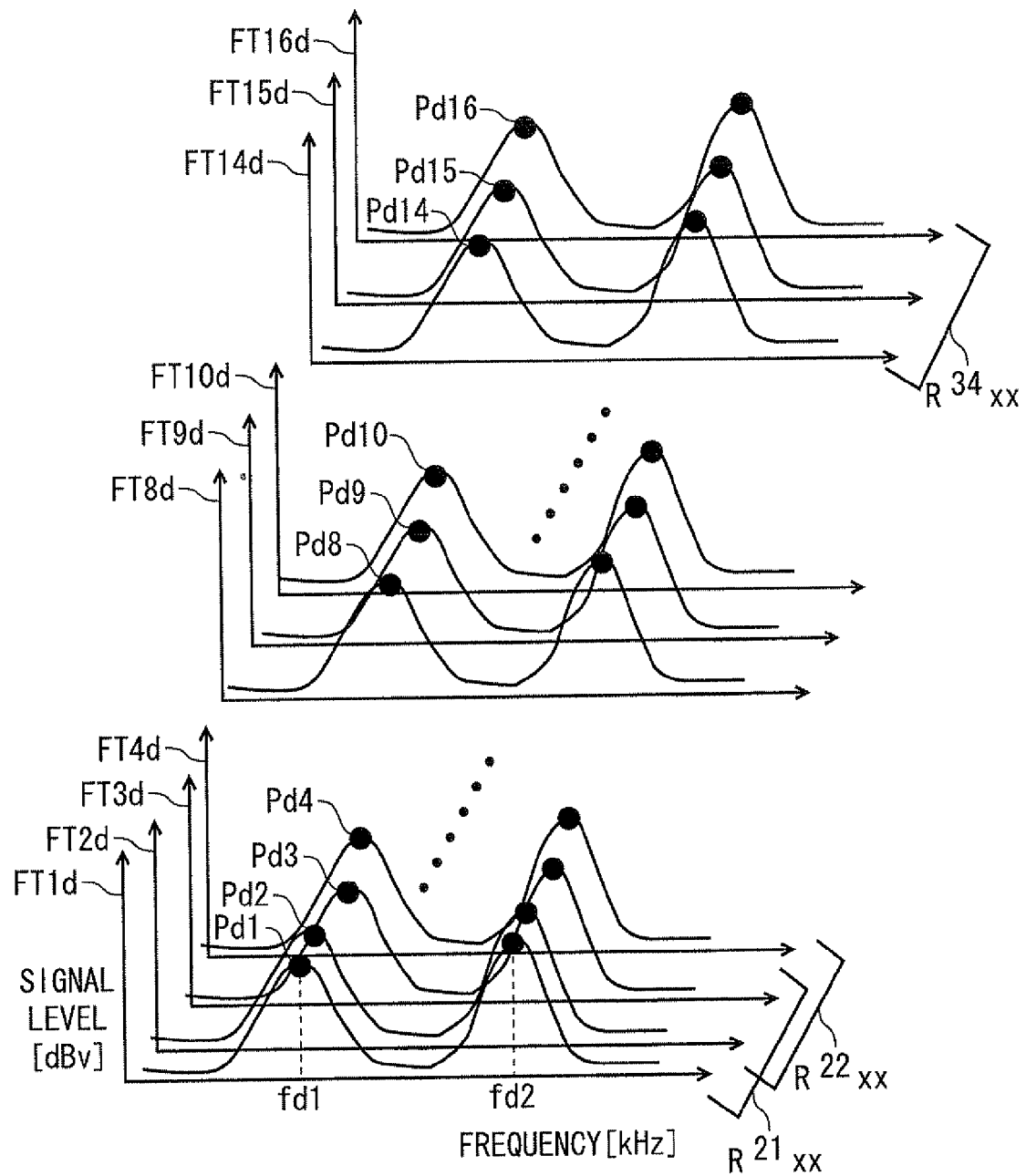
FIG. 5 is a diagram illustrating in detail the transformed data in a DOWN period.

Further, the peak extraction unit 103 extracts peak signals (for example, peak signals Pd1 to Pd16 of transformed data FT1$d$ to FT16$d$ shown in FIG. 5) having a frequency that is substantially the same as the frequency fd1 to which one peak signal (for example, a peak signal Pd1) belongs from the transformed data (16 pieces of transformed data) included in the DOWN period (periods D1 and D2) of 32 pieces of transformed data. On the other hand, the peak extraction unit

103 also extracts the peak signals at a different frequency (frequency fd2) in the same manner.

Then, the average processing unit 104 calculates 14 sets of correlation matrices (for example, correlation matrices $R^{21}xx$ to $R^{34}xx$ shown in FIG. 5), each set including peak signals of three pieces of neighboring transformed data when 16 pieces of transformed data are arranged, and an average value of the 14 sets of the calculated correlation matrices is derived using the spatial smoothing preprocessing.

FIG. 4 is a diagram illustrating in detail the transformed data corresponding to periods U1 and U2 that correspond to the UP period. The transformed data FT1$u$ to FT16$u$ shown in FIG. 4 are transformed data included in the UP period of the 32 pieces of transformed data. The vertical axis of each transformed data represents signal level [dBv], and the horizontal axis represents frequency [kHz]. A plurality of peak signals is present in each transformed data. The peak extraction unit 103 extracts the peak signals Pu1 to Pu16 which exceed a predetermined threshold value and have substantially the same frequency. On the other hand, these peak signals (peak signals Pu1 to Pu16) are corresponding peak signals based on the same detection point.

Then, the corresponding peak signals for each transformed data are divided into a plurality of sets, and the correlation matrices for each set are acquired. That is, the average processing unit 104 derives the correlation matrix $R^1xx$ of the peak signals Pu1, Pu2, and Pu3 that are corresponding peak signals for three transformed data FT1$u$, FT2$u$, and FT3$u$ that constitute one set.

Then, by shifting one transformed data, the average processing unit 104 derives the correlation matrix $R^2xx$ in which the corresponding peak signals for three transformed data FTu2, FT3$u$, and FT4$u$ constitute one set. As described above, the average processing unit 104 generates 14 sets of correlation matrices (correlation matrices $R^1xx$ to $R^{14}xx$), each of which corresponds to the peak signals for the three transformed data, and calculates the average value of the 14 sets of correlation matrices.

FIG. 5 is a diagram illustrating in detail the transformed data corresponding to periods D1 and D2 that correspond to the DOWN period. The transformed data FT1$d$ to FT16$d$ shown in FIG. 5 are transformed data included in the DOWN period of the 32 pieces of transformed data. The vertical axis of each transformed data represents signal level [dBv], and the horizontal axis represents frequency [kHz]. A plurality of peak signals is present in each transformed data. The peak extraction unit 103 extracts the peak signals Pd1 to Pd16 which exceed a predetermined threshold value and have substantially the same frequency.

Then, the transformed data are divided into a plurality of sets, and the correlation matrices for each set are acquired. That is, the average processing unit 104 derives the correlation matrix $R^{21}xx$ in which the peak signals for three transformed data FT1$d$, FT2$d$, and FT3$d$ constitute one set. Then, by shifting one transformed data, the average processing unit 104 derives the correlation matrix $R^{22}xx$ in which the corresponding peak signals for three transformed data FTu2, FT3$u$, and FT4$u$ constitute one set. As described above, the average processing unit 104 generates 14 sets of correlation matrices (correlation matrices $R^{21}xx$ to $R^{34}xx$), each of which corresponds to the peak signals for the three transformed data, and calculates the average value of the 14 sets of correlation matrices. On the basis of the eigenvalue and eigenvector of the average value of the correlation matrices obtained as above, the angle calculation unit 105 derives the angle of the detection point as described in detail in <4. Angular spectrum> below. Through this, even in the case where the transmission time of the transmitted waves is reduced, the reduction of the number of transformed data is prevented, and thus the respective angles of the objects corresponding to the detection points can be detected with high accuracy. On the other hand, a similar process is also performed for other frequency peaks present in the respective transformed data.

<4. Angular Spectrum>

Figure 6:
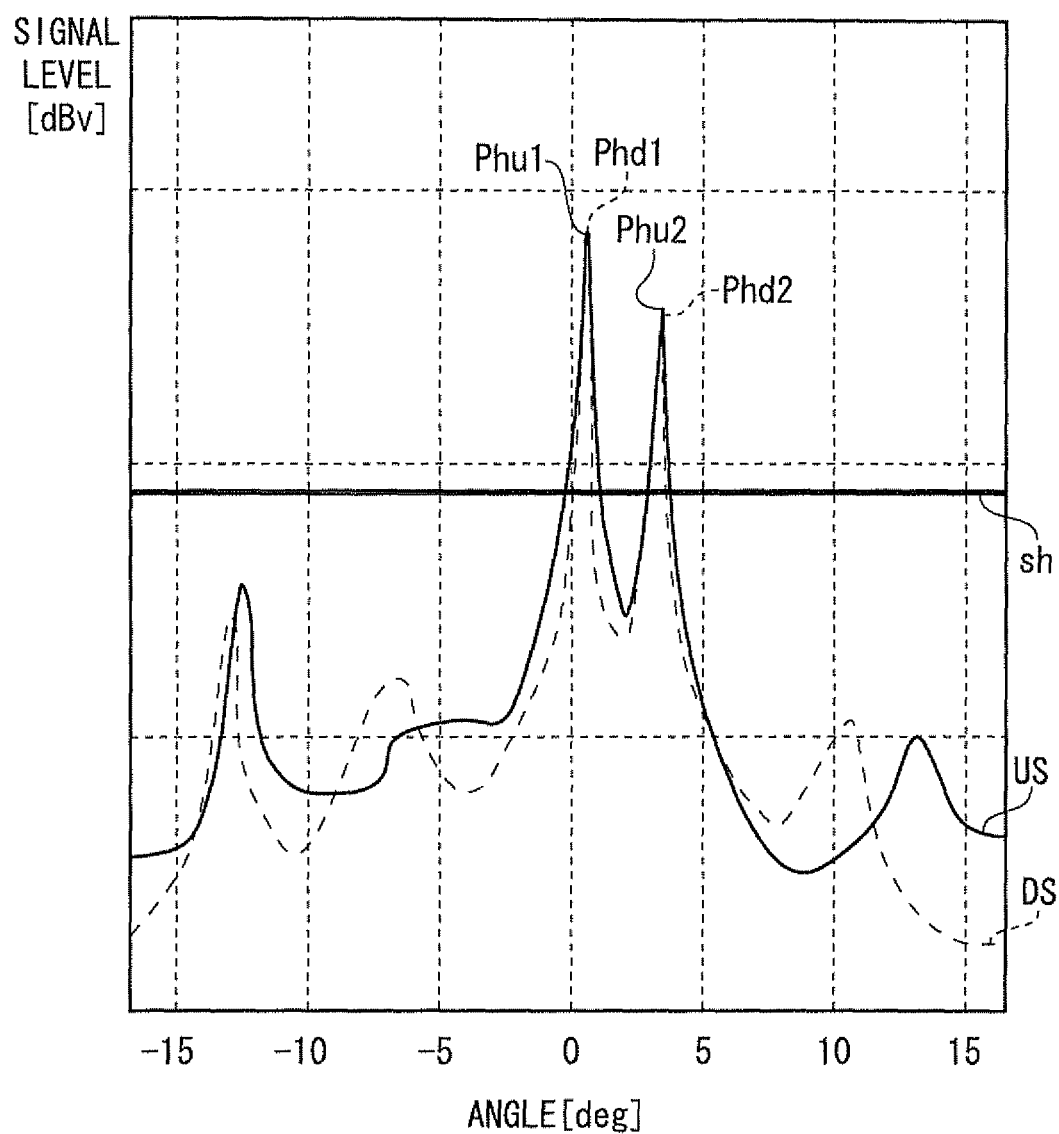
FIG. 6 is a diagram illustrating an angular spectrum at detection points of an object.

FIG. 6 is a diagram illustrating an angular spectrum at detection points of an object. A spectrum US indicates the angles of detection points in an UP period, and an angle peak Phu1 and an angle peak Phu2, which are signals that exceed a threshold value sh, indicate the angles of detection points derived from the eigenvalue and eigenvector of an average value of 14 sets of correlation matrices generated based on peak signals Pu1 to Pu16 having a peak frequency fu1 as shown in FIG. 4. That is, it is shown that angular information of two detection points is separated from information of the peak signals having the peak frequency fu1.

Here, one peak signal in the transformed data may be based on reflected waves from a plurality of detection points except when based on reflected waves from one detection point. That is, in the case where the values of respective angles of the detection points for a vehicle on which the radar apparatus is mounted differ from each other and the values of distances of the detection points for the vehicle on which the radar apparatus is mounted are equal to each other, information of the detection points may be included in one peak signal.

Because of this, as shown in the spectrum US of FIG. 6, in the case where two angle peaks Phu1 and Phu2 are present, it is shown that the information of two detection points corresponding to the angle peaks Phu1 and Phu2 is included in the peak signals (peak signals Pu1 to Pu16) of the transformed data in FIG. 4.

Further, a spectrum DS indicates the angles of detection points in a DOWN period, and an angle peak Phd1 and an angle peak Phd2, which are signals that exceed the threshold value sh, indicate the angles of detection points derived from the eigenvalue and eigenvector of an average value of 14 sets of correlation matrices generated by peak signals Pd1 to Pd16 having a peak frequency fd1 as shown in FIG. 5.

As shown in the spectrum DS of FIG. 6, in the case where two angle peaks Phd1 and Phd2 are present, it is shown that the information of two detection points corresponding to the angle peaks Phd1 and Phd2 is included in the peak signals (peak signals Pd1 to Pd16) of the transformed data in FIG. 5.

Then, the angular spectrum US in the UP period and the angular spectrum DS in the DOWN period are paired on the basis of the signal level and the angle. In FIG. 6, since the angle peaks Phu1 and Phd1 have substantially the same signal level and angle, the angle peaks Phu1 and Phd1 are paired. Further, since the angle peaks Phu2 and Phd2 have substantially the same signal level and angle, the angle peaks Phu2 and Phd2 are paired. Accordingly, an average of the two angle peaks is derived by the following equation (4), and the angle calculation unit 105 calculates the respective angles of the two detection points. Through this, it is possible to accurately acquire the respective angles of the detection points (for example, one detection point and the other detection point) present at substantially the same distance from the vehicle on which the radar apparatus 1 is mounted. On the other hand, in the equation, θm denotes an angel of a detection point, and θup denotes an angel corresponding to an angle peak phu1 (phu2). Further, θdn denotes an angle corresponding to an angle peak phd1 (phd2).

[Expression 4]

$$\theta m = \frac{\theta_{up} + \theta_{dn}}{2}$$

Further, in the angular spectrum US (DS) shown in FIG. 6, a plurality of angle peaks is derived. In the case where information of the detection points is included in one peak signal of the transformed data, if the number of data groups of the digital data is small, the number of correlation matrices becomes small, and the reduction rate of the mutual interference components through the spatial smoothing preprocessing using the correlation matrices is decreased. As a result, the angle peaks are synthesized with one angle peak, and the angles of the detection points may be incorrectly calculated.

Since the data division unit 101 divides the digital data to increase the number of data groups, the number of correlation matrices is increased, and the reduction rate of the mutual interference components through the spatial smoothing preprocessing using the correlation matrices is improved. Further, since the angle calculation unit 105 derives the angles of the detection points by the eigenvalue and the eigenvector that are derived using the average value of the correlation matrices derived by the spatial smoothing preprocessing, the angle peaks according to the number of detection points included in one peak of the transformed data are derived. Through this, the angles of the detection points can be accurately calculated.

After calculating the angles of the detection points, the distance/relative speed calculation unit 106 calculates the distance and the relative speed with respect to the detection points. In FIG. 6, the frequency of the angle peak Phu1 in the UP period of one detection point is the frequency fu1 as shown in FIG. 4. Further, the frequency of the angle peak Phd1 in the DOWN period is the frequency fd1 as shown in FIG. 5. Using the values of the frequencies fu1 and fd1, the distance and the relative speed of one detection point are calculated by equations (2) and (3).

Further, in FIG. 6, in the same manner as one detection point, the frequency of the angle peak Phu2 in the UP period of the other detection point is the frequency fu1, and the frequency of the angle peak Phd2 in the DOWN period is the frequency fd1. Using the values of the frequencies fu1 and fd1, the distance and the relative speed of the other detection point are calculated by equations (2) and (3). Through this, the position and the relative speed of the object can be derived with high accuracy.

<5. Processing Flowchart>

Figure 7:
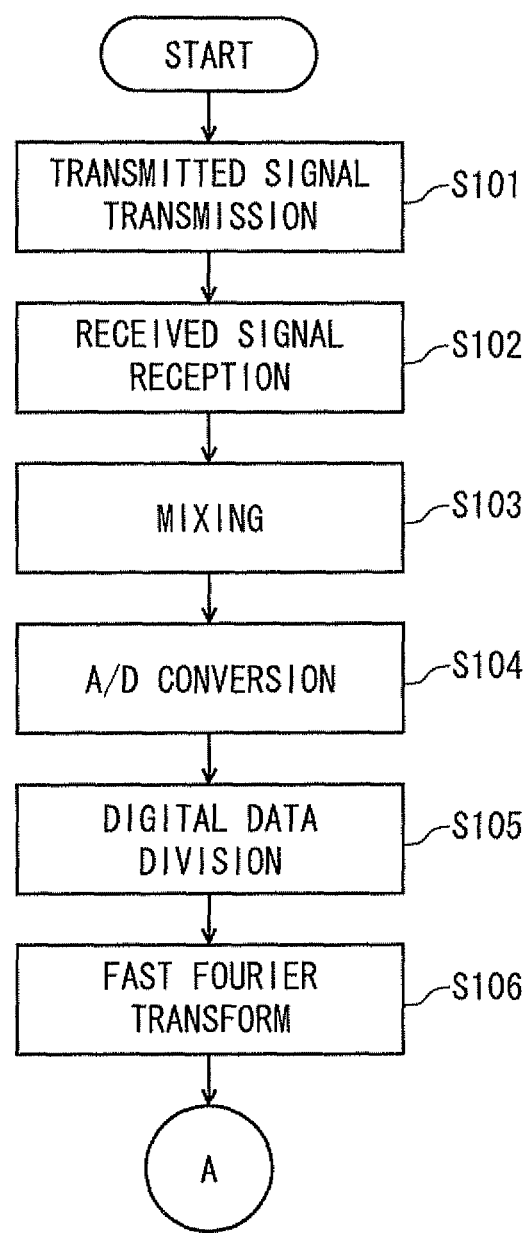
FIG. 7 is a flowchart illustrating a process performed by a radar apparatus.
Figure 8:
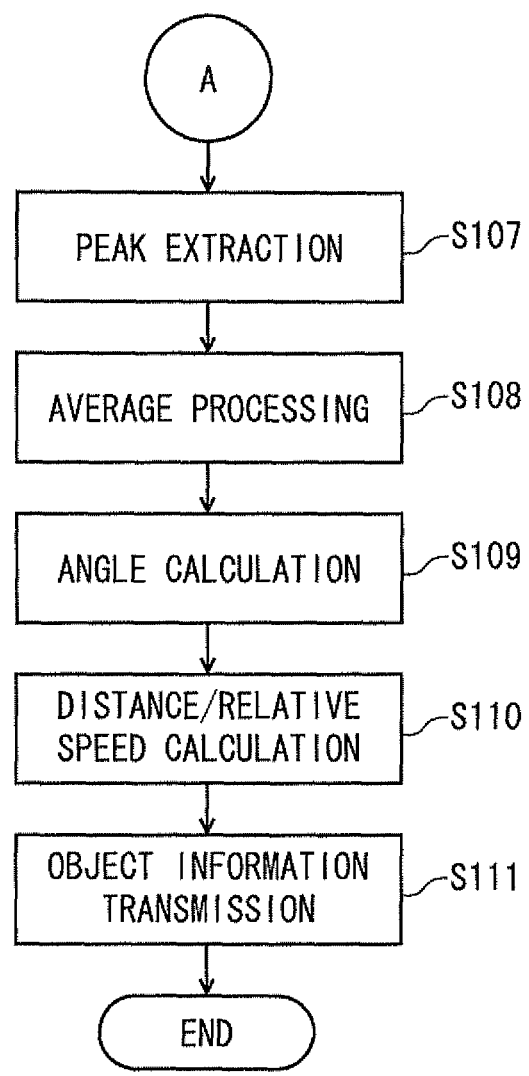
FIG. 8 is a flowchart illustrating a process performed by a radar apparatus.

FIGS. 7 and 8 are flowcharts illustrating the process performed by the radar apparatus 1. In step S101, the transmission antenna 13 outputs the transmitted waves that correspond to the transmitted signal output from the oscillator 12 to the outside of the vehicle, and the processing proceeds to step S1102.

On the other hand, in the case where one UP period and one DOWN period form one period in the transmitted signal TX, the transmitted waves from the transmission antenna 13, which correspond to the first period, are output from one transmission antenna 13a to the outside of the vehicle, and the transmitted waves which correspond to the second period are output from the other transmission antenna 13b to the outside of the vehicle. On the other hand, after two periods elapse, a non-transmission period in which the transmitted waves are not transmitted to the outside of the vehicle for a predetermined time is provided. After the time corresponding to the non-transmission period elapses, the transmitted waves corresponding to two periods of the transmitted signal TX are output again to the outside of the vehicle.

In step S102, the reception antenna 14 receives the reflected waves obtained through reflection of the transmitted waves from the object, and the processing proceeds to step S103.

In step S103, the mixer 15 mixes the received signal RX corresponding to the reflected waves received by the reception antenna 14 with the transmitted signal TX, generates a beat signal BS that is a difference between the transmitted signal TX and the received signal RX, and the processing proceeds to step S104.

In step S104, the AD converter 16 performs AD conversion to convert the beat signal BS that is an analog signal into digital data, and the processing proceeds to step S105.

In step S105, the data division unit 101 divides the digital data output from the AD converter 16 into the data groups, and the processing proceeds to step S106.

In step S106, the Fourier transform unit 102 performs fast Fourier transform with respect to the divided data groups to generate transformed data, and the processing proceeds to step S107.

In step S108 shown in FIG. 8, the peak extraction unit 103 extracts the peak signals that exceed the predetermined threshold value among the signals of the FFT-transformed data, and the processing proceeds to step S108.

In step S108, in the Up period and the DOWN period, the peak signals corresponding to the transformed data are divided into the sets, and the average processing unit 104 acquires the correlation matrices for the respective sets and derives the average value of the correlation matrices through addition of the correlation matrices of the respective sets, and the processing proceeds to step S109.

In step S109, the angles of the detection points pertaining to the object are calculated on the basis of the eigenvalue and the eigenvector of the average value of the correlation matrices derived by the average processing unit 104, and the processing proceeds to step S110.

In step S110, with respect to the detection points of which the angles are separated in step S109, the distance/relative speed calculation unit 106 calculates the distance between the detection point and the vehicle on which the radar apparatus 1 is mounted and the relative speed between the detection point and the vehicle on which the radar apparatus 1 is mounted on the basis of the peak frequencies of the transformed data, and the processing proceeds to step S111.

In step S111, information (the distance, the relative speed, and the angle) of the detection points pertaining to the object is output to the vehicle control apparatus 2 that outputs control signal to respective parts of the vehicle. Through this, vehicle control according to the position of the object corresponding to the detection point can be performed.

<Modified Examples>

The embodiments of the present invention have been described. However, the present invention is not limited to those embodiments, and various modifications may be made. Hereinafter, such modified examples will be described. On the other hand, all forms, including forms described in the above-described embodiments and forms to be described hereinafter, can be appropriately combined.

In the above-described embodiments, the radar apparatus 1 may be used in various applications (for example, at least one of monitoring of aircraft in flight and monitoring of ships sailing) in addition to those mounted on a vehicle.

Further, in the above-described embodiments, two transmission antennas and four reception antennas are provided. However, the number of transmission or reception antennas may be differently set, and for example, one transmission antenna and five reception antennas may be provided.

Further, in the above-described embodiments, the radar apparatus 1 is independently provided with the reception antennas 14 and the transmission antennas 13. The reception antennas may also serve as the transmission antennas. In this case, just after transmitting the transmitted waves, the respective antennas may be switched to a reception state so that the antennas receive the reflected waves obtained through reflection of the transmitted waves from the object.

Further, in the above-described embodiments, the radar apparatus 1 may be provided with dedicated processing circuits (the mixer 15 and the AD converter 16) for each reception antenna 14 or may be provided with a circuit that integrally processes received signals through all the reception antennas. In this case, although it is required that a time-division processing circuit controls sequential switching of the corresponding reception antenna 14 including the reception antennas 14a to 14d, it is possible to compact the circuit configuration of the radar apparatus 1.

Further, in the above-described embodiments, the data division unit 101 divides the digital data into data groups for a predetermined number of digital data. In addition, the number of digital data may be divided as the number of different data. Specifically, the data division unit 101 may divide 2500 pieces of digital data into a data group having 1500 pieces of data and a data group having 1000 pieces of data. Further, the data division unit 101 may divide the digital data into three or more data groups having different numbers of data, for example, a data group having 1200 pieces of data, a data group having 800 pieces of data, and a data group having 500 pieces of data.

Further, in the above-described embodiments, by performing division of the digital data and reducing the mutual interference components through increasing of the number of correlation matrices used in the spatial smoothing preprocessing, respective angles of the detection points having the same distance and different angles are calculated with high accuracy. In addition, in the case where the detection points having the same distance and different angles are not present, that is, in the case where one detection point is included in the peak signal, the angle of the one detection point can be calculated with high accuracy.

What is claimed is:

1. A signal processing apparatus configured to calculate an angle of a detection point corresponding to an object on the basis of received signals of a plurality of array antennas, the signal processing apparatus comprising:
a generating unit configured to generate a beat signal by a difference between a transmitted signal having a frequency that is changed in a predetermined period and a received signal obtained by receiving reflected waves of transmitted waves on the basis of the transmitted signal at the detection point;
a deriving unit configured to derive digital data through AD conversion of the beat signal;
a dividing unit configured to divide the digital data, in a portion of the predetermined period in which the frequency changes, into a plurality of data groups;
an acquiring unit configured to perform a fast Fourier transform on the data groups to acquire a plurality of transformed data corresponding to the number of the data groups;
a first calculating unit configured to divide the transformed data into a plurality of sets, acquires correlation matrices for the respective sets, and calculate an average value of the correlation matrices; and
a second calculating unit configured to calculate the angle of the detection point on the basis of the average value of the correlation matrices.

2. The signal processing apparatus according to claim 1, wherein the dividing unit divides the digital data into the data groups for a predetermined number of data.

3. The signal processing apparatus according to claim 1, wherein the dividing unit divides the digital data in a first period wherein the frequency of the transmitted signal ascends and in a second period where the frequency of the transmitted signal descends.

4. A radar apparatus comprising:
the signal processing apparatus according to claim 1;
a transmitting unit configured to transmit the transmitted waves;
a receiving unit configured to receive the reflected waves; and
an outputting unit configured to output information on the detection point detected by the signal processing apparatus to a vehicle control device which controls respective parts of a vehicle.

5. A signal processing method for calculating an angle of a detection point corresponding to an object on the basis of received signals of a plurality of array antennas, the signal processing method comprising:
generating a beat signal by a difference between a transmitted signal having a frequency that is changed in a predetermined period and a received signal obtained by receiving reflected waves of transmitted waves on the basis of the transmitted signal at the detection point using a mixer:
deriving digital data through AD conversion of the beat signal using an AD converter;
diving the digital date, in a portion of the predetermined period in which the frequency changes, into plurality of the data group using a signal processor;
performing a fast Fourier transform on the data groups to acquire a plurality of transformed data corresponding to the number of the data groups using the signal processor;
dividing the transformed data into a plurality of sets, acquiring correlation matrices for the respective sets, and calculating an average value of the correlation matrices using the signal processor; and
calculating the angle of the detection point on the basis of the average value of the correlation matrices using the signal processor.

\* \* \* \* \*